United States Patent
Szolusha

(10) Patent No.: US 9,178,427 B1
(45) Date of Patent: Nov. 3, 2015

(54) FLOATING OUTPUT VOLTAGE BOOST-BUCK REGULATOR USING A BUCK CONTROLLER WITH LOW INPUT AND LOW OUTPUT RIPPLE

(71) Applicant: Linear Technology Corporation, Milpitas, CA (US)

(72) Inventor: Keith D. Szolusha, Saratoga, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 14/638,868

(22) Filed: Mar. 4, 2015

Related U.S. Application Data

(60) Provisional application No. 62/042,094, filed on Aug. 26, 2014.

(51) Int. Cl.
*H05B 37/02* (2006.01)
*H02M 3/158* (2006.01)
*H05B 33/08* (2006.01)

(52) U.S. Cl.
CPC ........... *H02M 3/158* (2013.01); *H05B 33/0815* (2013.01)

(58) Field of Classification Search
CPC .............. H05B 37/02; H05B 33/0815; H05B 33/0848; H05B 33/0887; G05F 1/10; G05F 5/00
USPC ....... 315/185 R, 210; 323/271, 282; 363/101, 363/127
See application file for complete search history.

(56) References Cited

U.S. PATENT DOCUMENTS

| 4,274,133 | A | 6/1981 | Cuk et al. | |
|---|---|---|---|---|
| 4,672,303 | A | 6/1987 | Newton | |
| 5,442,534 | A | 8/1995 | Cuk et al. | |
| 8,125,205 | B2 * | 2/2012 | Chandrasekaran | H01F 37/00 323/282 |
| 2004/0100149 | A1 * | 5/2004 | Lai | H02J 9/062 307/82 |
| 2004/0164557 | A1 | 8/2004 | West | |
| 2008/0037305 | A1 | 2/2008 | West | |
| 2012/0319604 | A1 * | 12/2012 | Walters | H02M 3/1582 315/200 R |
| 2014/0117878 | A1 * | 5/2014 | Prodic | H05B 33/0815 315/307 |

OTHER PUBLICATIONS

PCT/US15/029684, EPO as ISA, "International Search Report and Written Opinion", dated Apr. 8, 2015, 11 pages.

\* cited by examiner

*Primary Examiner* — Daniel D Chang
(74) *Attorney, Agent, or Firm* — Patent Law Group LLP; Brian D. Ogonowsky

(57) ABSTRACT

A converter generates an output voltage differential across a floating load, such as a string of LEDs. The converter receives an input voltage Vin from a power supply, and the floating output voltage differential may be greater than or less than Vin. The converter uses a first switch and first inductor in a boost mode type configuration, and uses a second switch and second inductor in a buck mode type configuration. The inductors have a common node. The first inductor has another end coupled to ground, and the other end of the second inductor is coupled to the load. Both inductors charge and discharge together depending on the conductivities of the switches. One end of the load will be approximately zero volts, while the other end will be at a negative voltage VEE. The two inductors smooth input current/voltage ripple and output current/voltage ripple, resulting in low EMI.

14 Claims, 7 Drawing Sheets

FLOATING OUTPUT VOLTAGE BOOST-BUCK REGULATOR USING A BUCK CONTROLLER WITH LOW INPUT AND LOW OUTPUT RIPPLE

CROSS REFERENCE TO RELATED APPLICATIONS

This application claims priority from U.S. provisional application Ser. No. 62/042,094, by Keith D. Szolusha, filed Aug. 26, 2014, assigned to the present assignee and incorporated by reference.

FIELD OF INVENTION

The present invention relates to voltage or current regulators and, in particular, to a regulator configuration that outputs a voltage across a floating load, such as a string of light emitting diodes (LEDs), where the voltage across the load may be greater than or less than the input voltage, and where a first inductor smoothes input current or input voltage ripple and where a second inductor smoothes output current or output voltage ripple for low EMI.

BACKGROUND

It is common to drive a series string of LEDs using a DC/DC switch mode power supply converter. One end of the LED string may be connected to a reference source (e.g., ground or the input voltage), or both ends of the string may be floating, since only the regulated current through the string is relevant to light output. The converter can be a step up (boost) or step down (buck) converter. There are other types of converters (buck-boost) using four switches that boost or buck the input voltage as needed. The additional switches add cost and size, and the transition between the buck and boost modes can create noise. Such buck-boost converters do not have both low input voltage ripple and low output voltage ripple, so generate higher EMI than desirable.

What is needed is an efficient converter for a floating load, such as a string of LEDs, where only two switches are required, and where the configuration inherently smoothes both input and output current ripple for low EMI. The converter should output a voltage across the floating load that can be either greater than or less than the input voltage while regulating the LED string current. The switch controller may be an off-the-shelf buck controller IC due to features offered by buck controllers that are not available with boost controllers or buck-boost controllers. Using such an off-the-shelf buck controller will also greatly reduce the cost of implementation of the converter.

SUMMARY

For driving a string of LEDs, it is not necessary that either side of the LEDs be connected to a reference voltage, such as ground or the input voltage power supply, since it is only the current through the LEDs (and resulting voltage across the LEDs) that controls the brightness of the LEDs. Other types of floating loads include battery chargers and motors. The example described herein uses LEDs, but any floating load may be used.

In one embodiment of the present invention, an off-the-shelf conventional buck controller IC is configured in a novel way to generate any voltage across a string of LEDs, where both the upper and lower voltages applied to the string of LEDs are controlled by the controller to cause a regulated current to flow through the LEDs. The voltage differential across the string of LEDs may be greater than or less than the input voltage. Only two switching transistors are needed for a synchronous configuration, or one switch and one diode are needed for an asynchronous configuration. The configuration uses two inductors or a single coupled inductor: one inductor for input ripple smoothing and the other inductor for output ripple smoothing, so there is very little EMI generated due to the high frequency switching (e.g., 100 KHz-5 MHz).

In the preferred embodiment, a high side MOSFET and a low side MOSFET (the high frequency switching switches) are coupled between the input voltage Vin and a negative voltage VEE that is generated by the converter. VEE is coupled to a first end (cathode end) of the LED string. A first inductor has a first end coupled to the node between the MOSFETs and has a second end coupled to ground via a low value first sense resistor. A second inductor is connected between the node and the second end (anode end) of the LED string, where the converter's operation results in the voltage at the second end of the LED string to be approximately 0 volts, so the voltage across the LED string is approximately VEE.

The converter generates a target (regulated) current through the LED string, which results in a certain voltage VEE at one end of the string. A pulse width modulation (PWM) MOSFET and second sense resistor are coupled in series between the string of LEDs and VEE. The buck controller outputs a relatively low frequency (e.g. 100 Hz) signal for application to the PWM MOSFET to control the perceived brightness of the LEDs. When the PWM MOSFET is on, the LED current is fed back to the controller, via the second sense resistor. The controller regulates the high-frequency high side MOSFET duty cycle so that the LED current matches a target current set by the user.

To regulate the output current, the controller controls the peak instantaneous current though the high side MOSFET when it is on, via the first sense resistor, and the first inductor smoothes the switching noise from the high side MOSFET so there is very little ripple that is injected on the power supply bus, resulting in low EMI. This type of controller is called a peak current mode controller. When the high side MOSFET is on, both the first and second inductors charge.

When the high side MOSFET is turned off and the low side MOSFET is turned on, the first and second inductors discharge, resulting in a regulated LED current being generated. The current through the LED string is smoothed by the second inductor and an output capacitor, so there is very little output voltage ripple and low EMI. The output capacitor is optional for an LED application.

The low side MOSFET may be replaced with a freewheeling (or catch) diode for an asynchronous configuration, but efficiency will be slightly reduced.

In an alternate embodiment, two sets of switches are used, where each set of switches is controlled by a single gate signal, enabling this alternate embodiment to use a conventional buck controller IC.

Many off-the-shelf buck controllers are suitable.

DETAILED DESCRIPTION

Figure 1:
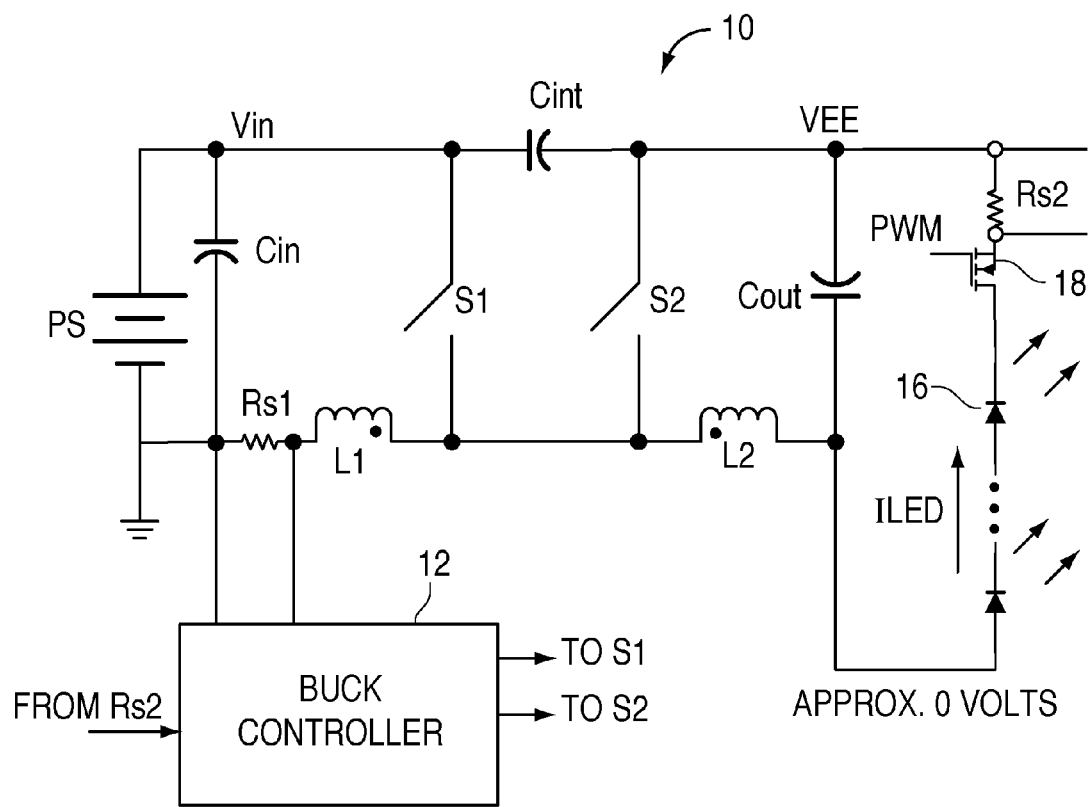
FIG. 1 illustrates the novel configuration of a boost mode-then buck converter, using two switching transistors, that drives a floating string of LEDs with a target current.

FIG. 1 illustrates an embodiment of a current regulator 10 in accordance with one embodiment of the invention. A regulator controller 12 may be a conventional buck controller IC connected in the novel configuration. The controller 12 may have various features unrelated to the present invention but are desired by the system designer.

A power supply PS provides the input voltage Vin relative to ground. An input capacitor Cin reduces switching noise coupled to the power supply bus. A string of LEDs 16 is connected across the floating output terminals of the current regulator 10.

The controller 12 contains an oscillator that may create a switching frequency of greater than 100 kHz.

During steady state operation, switch S1, which may be a MOSFET or other suitable transistor switch, closes at the beginning of a switching cycles to couple Vin across the inductor L1. The inductor L1 is then charged with a ramping current. Since the current conducted by the inductor L1 is smoothly ramping, very little ripple is coupled to the power supply bus. As a result, EMI is minimized. Operation of the switch S1 is similar to a boost mode of operation.

The ramping current through the switch S1 and inductor L1 is detected by a differential amplifier in the controller 12 monitoring the voltage across the low value sense resistor Rs1. This instantaneous current is a first feedback signal. Other types of instantaneous current detection can be used, such as the voltage drop across the switch S1. The sense resistor Rs1 can be in series with inductor L1 or it can be in series with switch S1.

The controller 12 shuts off the switch S1 when the instantaneous current through switch S1 reaches a threshold value (sometimes referred to as a control signal) determined by a target current through the string of LEDs 16. When the PWM MOSFET 18 is on and current flows through the LEDs and the low value sense resistor Rs2, a difference amplifier in controller 12 measures the voltage across the resistor Rs2 to sense the output current (ILED). This output current (ILED) signal is a second feedback signal. An error amplifier in the controller 12 determines the difference between a first signal corresponding to the actual output current and a second signal corresponding to the target current, typically set by the user. The feedback loop generates the threshold value having a magnitude that corresponds to the duty cycle and peak current of the switch S1 needed to keep the output current equal to the target current.

When the switch S1 is closed, Vin is also applied to the left terminal of the second inductor L2, and the inductor L2 is also charged with a ramping current.

When the ramping current though the inductor L1 (or switch S1) crosses the threshold value, a PWM comparator in the controller 12 shuts off the switch S1 and turns on the switch S2. When switch S1 turns off, the right side terminal of the inductor L1 goes negative, and the left side of the inductor L2 goes negative. This negative voltage is applied to the top terminal of the output capacitor Cout (via the switch S2). The inductors L1 and L2 are discharged by a ramping down current through the switch S2. The switch S2 turns off and switch S1 turns back on when the main oscillator determines that the next switching cycle should begin.

The voltage at the right side of the inductor L2 is approximately 0 volts because the inductor L2 is being equally charged and discharged by the switches S1 and S2 for each cycle in order for the system to remain stable. Thus, the voltage across the output capacitor Cout and across the string of LEDs 16 is approximately VEE. VEE results when the target (regulated) current flows through the string of LEDs 16 when the PWM MOSFET 18 is on.

An interim capacitor Cint blocks DC current between Vin and VEE and further filters switching noise. Capacitor Cint provides a short path for the high dI/dt 'hot-loop' currents to flow to keep the high dI/dt currents from reaching either the input or output capacitors, keeping high frequency EMI low.

At the beginning of the next the switching cycle, switch S1 is turned on again and switch S2 is turned off.

Switch S2 (along with switch S2' in FIG. 4) may be replaced by a freewheeling (or catch) diode, such as a Schottky diode; however, a small diode drop will then occur, reducing efficiency. In either configuration, the switch S2/S2' and diode act as rectifiers.

As seen, the converter 10 generates a floating negative voltage VEE and a floating voltage of approximately 0 volts to achieve a target current ILED through the string of LEDs 16.

Basically, the operation of switches S1 and S2, together, causes the converter to operate as a boost mode-then buck converter, which generates a floating voltage differential which can be greater than or less than Vin. The controller 12 uses "current mode" to regulate a peak current through the switch S1 to achieve the target current through the LEDs. There is very little input and output ripple due to the inductors L1 and L2 and the capacitors Cin, Cint, and Cout.

The inductors L1 and L2 can be relatively small since both inductances are employed during the charging and discharging cycles. Therefore, EMI is reduced at the input and output without any increase in the overall size of an inductor. Although an input capacitor and output capacitor may filter switching frequency noise, the inductors L1 and L2 reduce the magnitudes of such switching frequency noise, enabling the capacitors to be smaller.

In an embodiment where the inductors L1 and L2 are coupled inductors, the polarities of the inductors are designated by dots in FIG. 1.

In another embodiment, the valley current through the switch S2 or the inductor L1 is used to trigger the switching of the switches S1 and S2 instead of the peak current. The regulating will be the same.

Figure 2A:
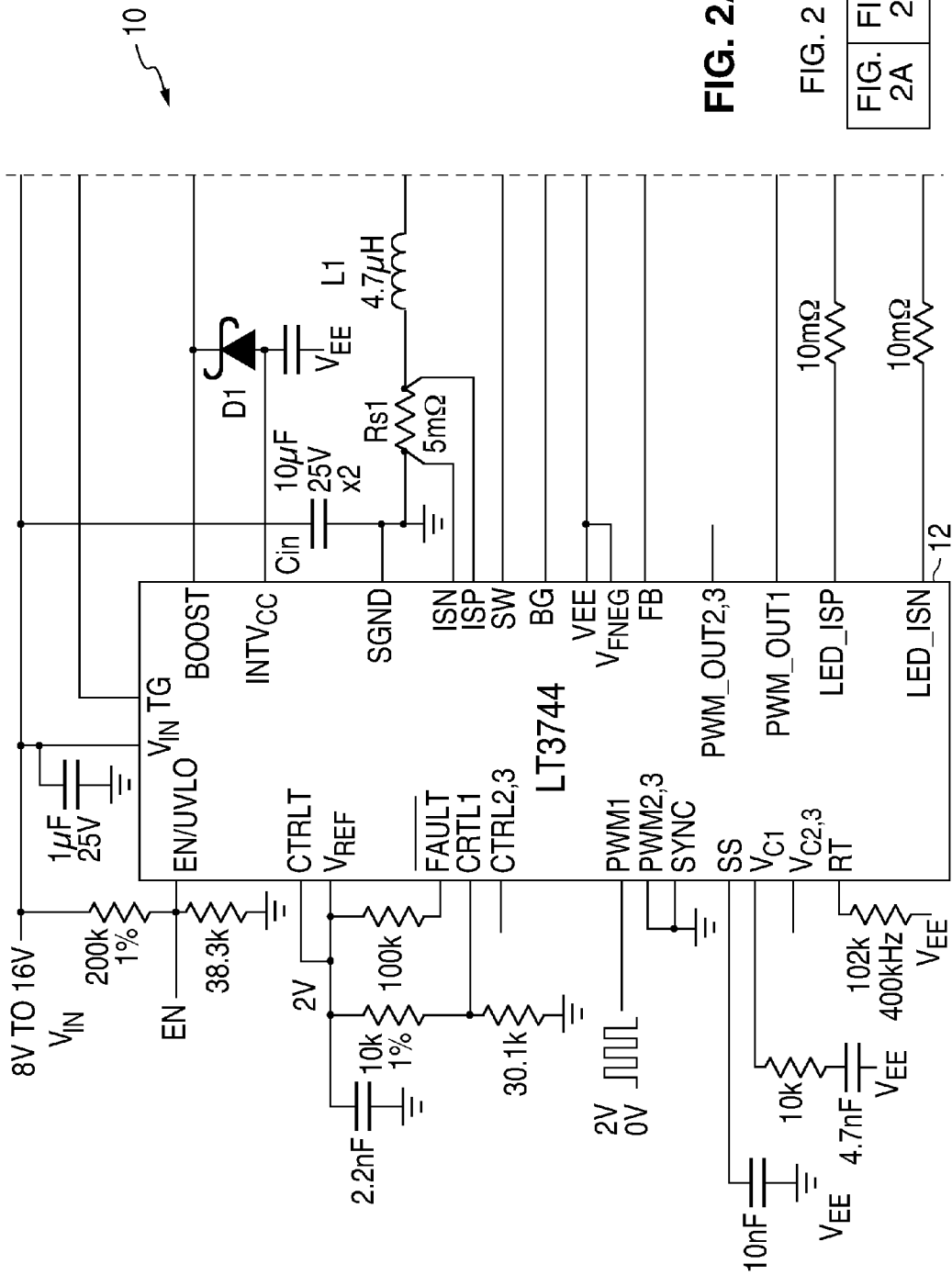
FIG. 2 illustrates the configuration of FIG. 1 when using a particular buck controller IC. Many other off-the-shelf buck controllers may be used instead.
Figure 2B:
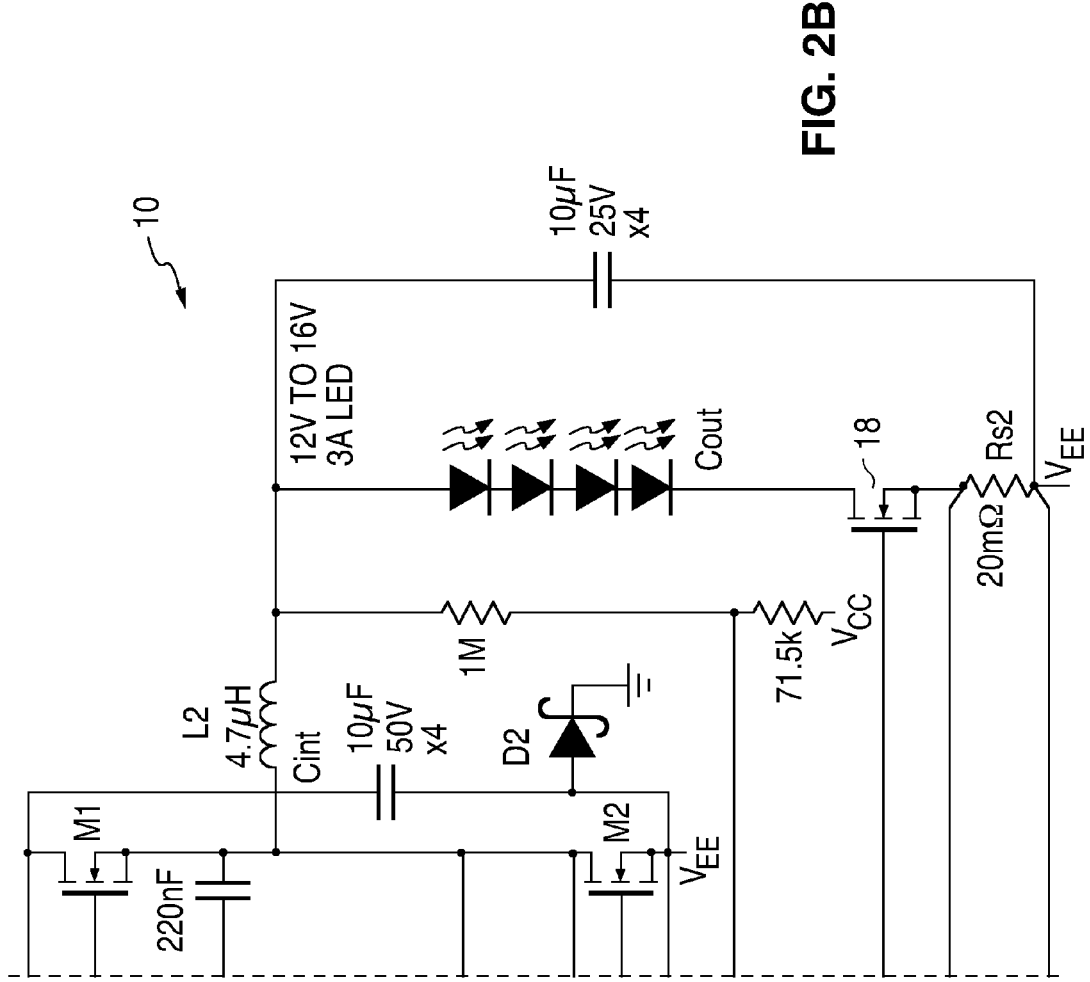

FIG. 2 illustrates the configuration of FIG. 1 using an LT3744 buck controller IC, by Linear Technology Corporation, as the controller 12. Many other types of commercially available "current mode" buck controllers, especially those for driving LEDs, can be used that sense the current through the load for regulating the output current.

In the example of FIG. 2, switch S1 is an N-channel MOSFET M1, and switch S2 is an N-channel MOSFET M2. Various components used for overvoltage protection, overcurrent protection, generating the required gate voltages, controlling the oscillator frequency, soft-start, and terminating the package leads are shown in FIG. 2 but are not relevant to the present invention.

The controller 12 package has an input terminal PWM1 for receiving an externally generated, low frequency PWM signal for controlling the PWM MOSFET 18. When the PWM MOSFET 18 is on, the current through sense resistor Rs2 is sensed. The low frequency PWM signal for the PWM MOSFET 18 can be a level-shifted signal from the input PWM signal and it can either refer to LED− or to LED+ in order to turn the LED string on and off.

Figures 3, 3A:
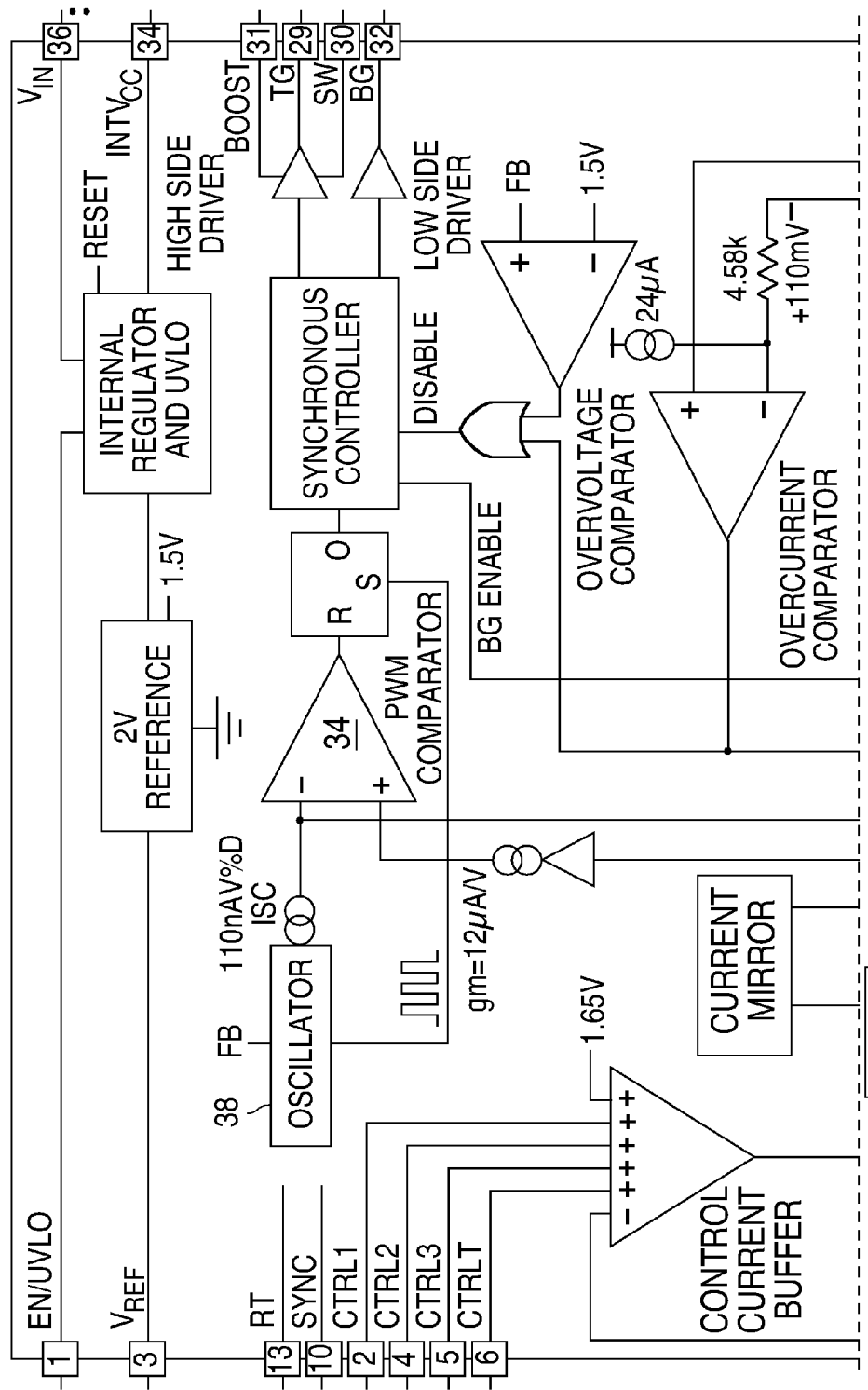
FIG. 3 illustrates the internal structure of the buck controller of FIG. 2.
Figure 3B:
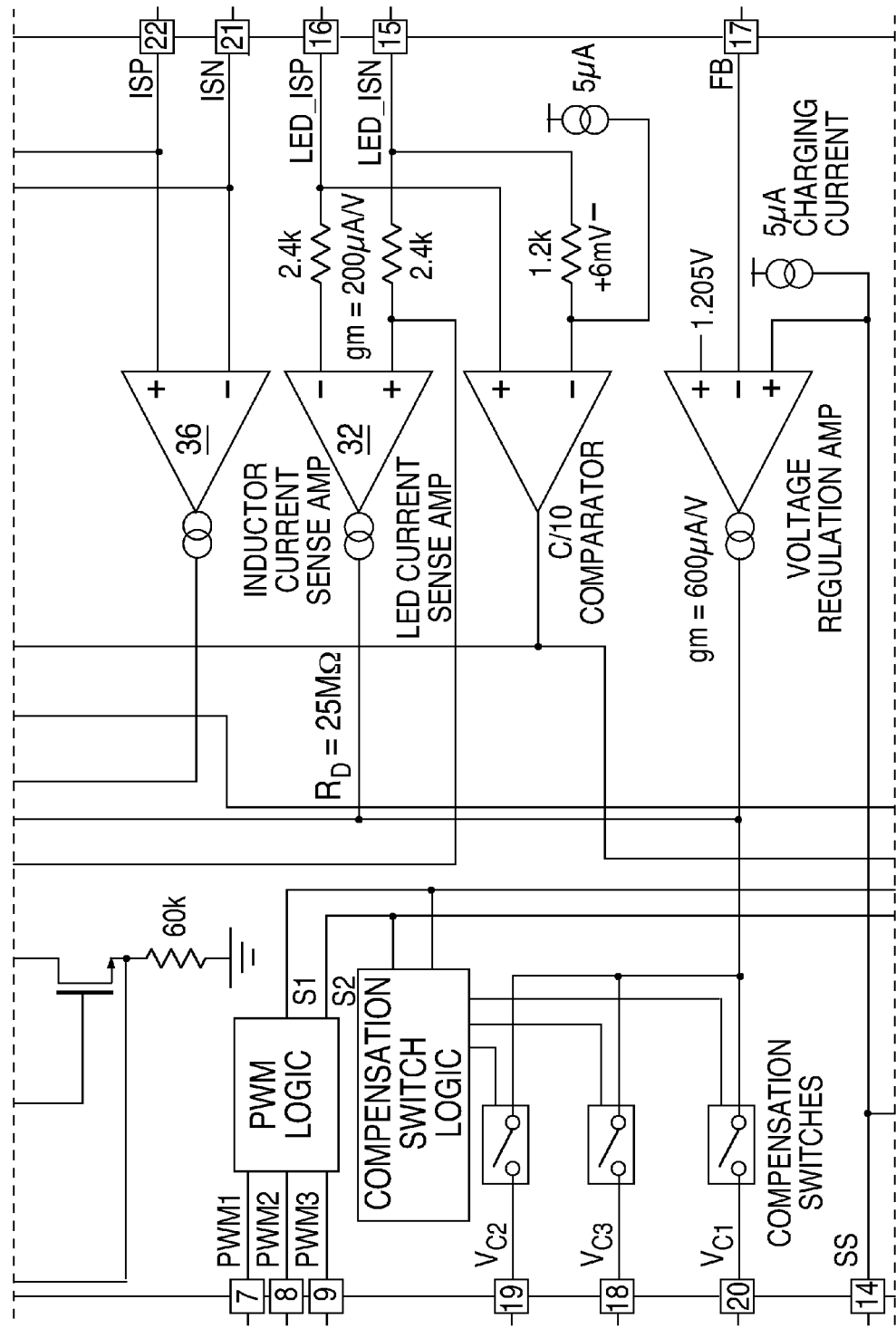
Figure 3C:
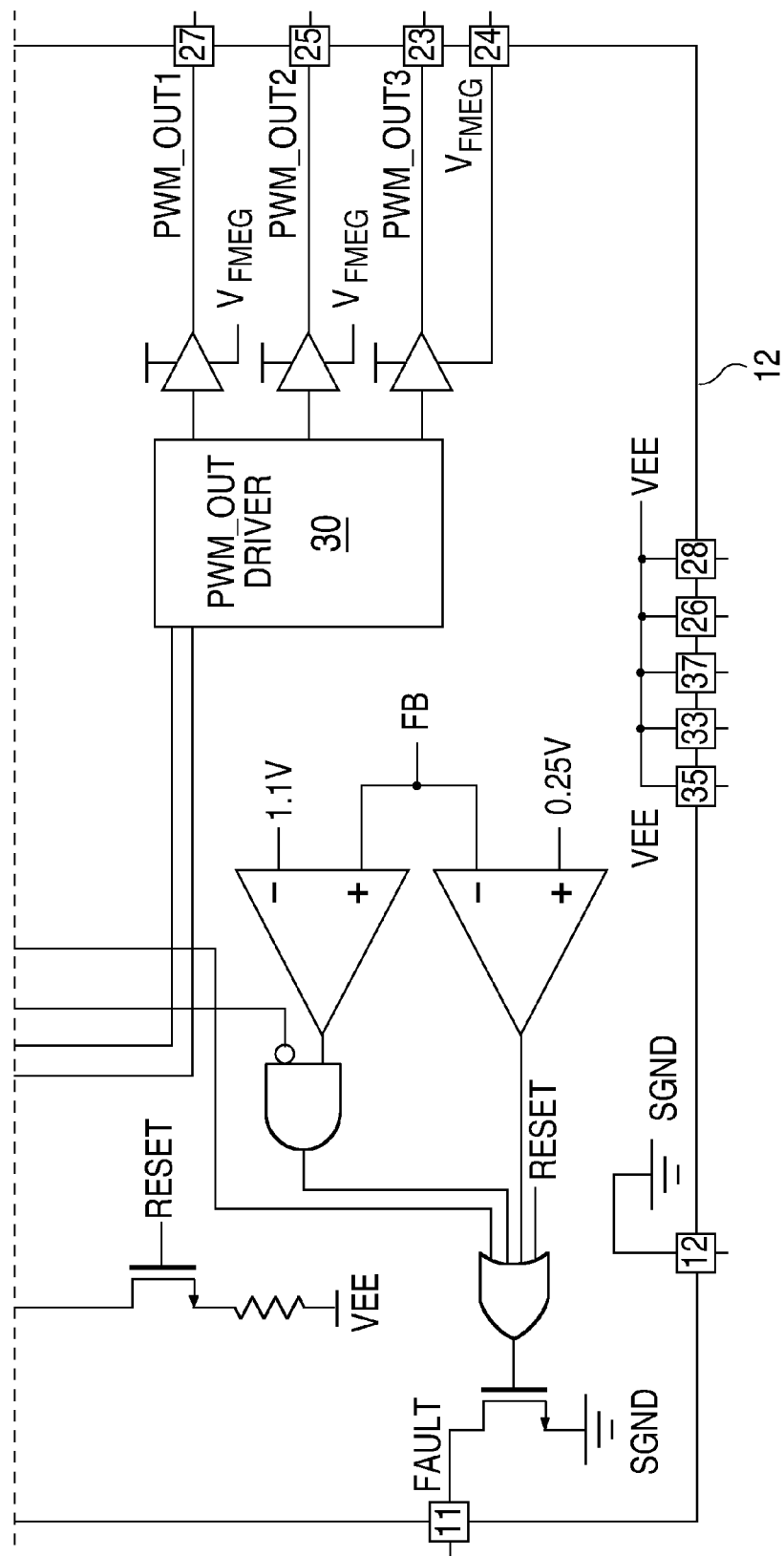

FIG. 3 is a schematic diagram of the circuitry internal to the LT3744 buck controller IC of FIG. 2. The labeling of the circuits and their connections completely convey the operation of the controller to one skilled in the art. The relevant circuitry used in the controller may be conventional.

The PWM out driver 30 supplies the required gate voltages to the PWM MOSFET 18 (FIG. 2). The LED current sense amp 32 outputs a threshold value to the PWM comparator 34 that sets the required duty cycle needed to cause the inputs into the LED current sense amp 32 to be equal. The instantaneous ramping current through the sense resistor Rs1 (FIG. 2) is sensed by the inductor current sense amp 36, and its output, along with the oscillator 38 signal, are applied to the other input of the PWM comparator 34. The output of the PWM comparator 34 turns off the switch S1 when the ramping current signal crosses the threshold value generated by the LED current sense amp 32. The oscillator 38 then turns the switch S1 back on at the start of the next switching cycle. The target current is set by the user with the sense resistor Rs2. The target current can be further adjusted by the user with an external resistor divider (FIG. 2) or voltage connected to the CTRL1 terminal. The aspects of the LT3744 used in the present invention may be conventional. Buck controllers offer many features that are desired by the user but are not available with conventional boost-buck regulators.

In one example, the LEDs 16 may be three series-connected LEDs requiring about 12 volts to be turned on. Therefore, VEE must be at least −12 volts. The LED load may be any other load that does not need to be connected to ground.

Although the converter 10 has been described as regulating a current though the load (via the sense resistor Rs2), the feedback signal for generating the duty cycle control signal may correspond to a voltage across the load, so the converter regulates the voltage across the load. The voltage feedback may be a divided voltage, where an error amplifier in the buck controller receives the divided voltage and a reference voltage, and the controller controls the duty cycle to match the inputs into the error amplifier.

Figure 4:
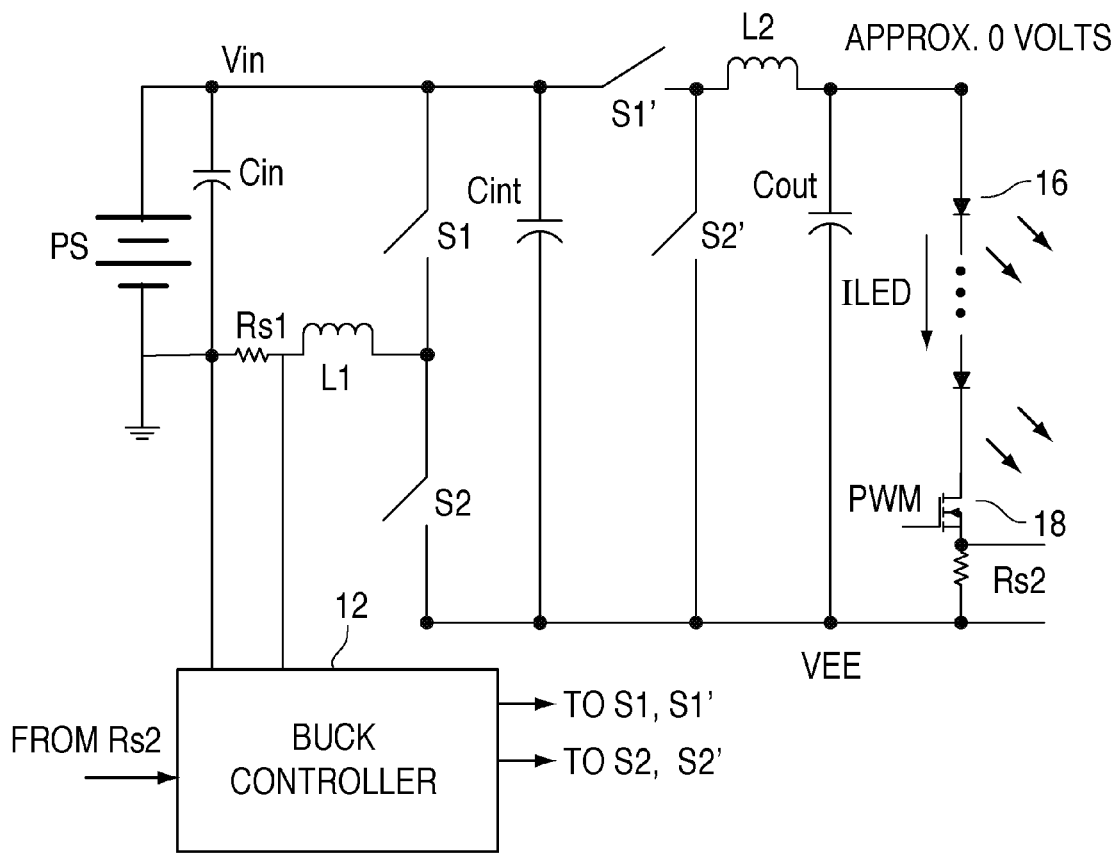
FIG. 4 illustrates a novel configuration of a boost mode-then buck mode converter, using two sets of switching transistors, that drives a floating string of LEDs with a target current.

Although the configuration of FIGS. 1 and 2 is preferred due to the use of only two switches (and only one if a freewheeling diode is used instead of switch S2), the boost mode-then buck circuit may also be implemented with four switches, as shown in FIG. 4, while achieving the same overall results of low EMI as a result of the two inductors L1 and L2.

In FIG. 4, both switches S1 and S1' are switched simultaneously and in the same way, and both switches S2 and S2' are switched simultaneously and in the same way. Otherwise the operation is identical to that of FIGS. 1 and 2. The duty cycle would be the same as for FIGS. 1 and 2 with the same target current. In FIG. 4, the switches S1 and S2 perform a boost mode operation, and the switches S1' and S2' perform a buck operation. S2 and S2' can be replaced with diodes in the same manner as before.

The output capacitor Cout in all embodiments is optional, especially for an LED driver, but may be desirable for further smoothing output ripple in certain applications. The small triangular inductor ripple passing through the LEDs is not visible to an observer, and having no output capacitor allows the user to quickly switch between different numbers of LEDs without significant overshoot or undershoot.

In another embodiment, the entire circuit except for large capacitors and inductors can be formed as a single IC, so a separate buck controller IC is not used.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A circuit having a converter coupled to drive a floating load comprising:
    an input terminal for receiving an input voltage Vin;
    a first inductor having a first end for being coupled to ground;
    a first switch coupled to a second end of the first inductor for coupling the second end to the input voltage when the first switch is in an on-state to charge the first inductor;
    a rectifier coupled to the second end of the first inductor for electrically coupling the second end of the first inductor to a first terminal of the load when the first switch is in an off-state, wherein the converter generates a voltage VEE at the first terminal during steady state operation;
    a first capacitor coupled between the input voltage and the first terminal of the load, wherein a voltage across the first capacitor equals Vin-VEE, where VEE is a negative voltage with respect to ground at the first terminal of the load;
    a second inductor having a first end coupled to the second end of the first inductor at least during a time when the first switch is in its on-state, wherein the load is coupled between a second end of the second inductor and the first capacitor; and
    a controller coupled to receive a first feedback signal corresponding to an instantaneous current through the first inductor when the first switch is on, and the controller coupled to receive a second feedback signal corresponding to a load current or load voltage,
    wherein the controller controls at least the first switch to regulate a peak current through the first inductor to regulate the load current or load voltage.

2. The circuit of claim 1 wherein the floating load is a light emitting diode (LED) load.

3. The circuit of claim 2 wherein the LED load further comprises a PWM dimming switch in series with a string of LEDs, such that the second capacitor is across the PWM dimming switch and the string of LEDs, wherein a duty cycle of the PWM dimming switch is used to control a perceived brightness of the LEDs.

4. The circuit of claim 1 wherein the first end of the first inductor is coupled to ground via a sense resistor for detecting the instantaneous current through the first inductor.

5. The circuit of claim 1 wherein the first end of the second inductor is directly coupled to the second end of the first inductor.

6. The circuit of claim 1 wherein the rectifier comprises a second switch controlled by the controller to have a state opposite to a state of the first switch.

7. The circuit of claim 6 wherein the first end of the second inductor is coupled to the second end of the first inductor via the first switch and a third switch, wherein the third switch is in series between the first end of the second inductor and the input voltage.

8. The circuit of claim 1 wherein the first end of the second inductor is coupled to the input voltage when the first switch is in its on-state.

9. The circuit of claim 1 wherein the load comprises a sense resistor connected in series with the load for detecting a current through the load as the second feedback signal.

10. The circuit of claim 1 wherein the converter generates a regulated current.

11. The circuit of claim 1 wherein the converter generates a regulated voltage.

12. The circuit of claim 1 wherein the controller is a packaged buck controller integrated circuit.

13. The circuit of claim 1 wherein the first switch and the second switch are N-channel MOSFETs.

14. The circuit of claim 1 further comprising a second capacitor coupled between the second end of the second inductor and VEE so as to be across the load.

\* \* \* \* \*